2 Sheets—Sheet 1.

R. CUNNINGHAM,

Assignor to E. W. BLATCHFORD & C. F. GATES.

Device for Making Plumbers' Traps.

No. 9,779. Reissued June 28, 1881.

Witnesses:

John C. Tunbridge

Willy R. C. Schmeltz

Inventor:

Robert Cunningham by his attorney

A. V. Briesen

2 Sheets—Sheet 2.
R. CUNNINGHAM,
Assignor to E. W. BLATCHFORD & C. F. GATES.
Device for Making Plumbers' Traps.
No. 9,779. Reissued June 28, 1881.
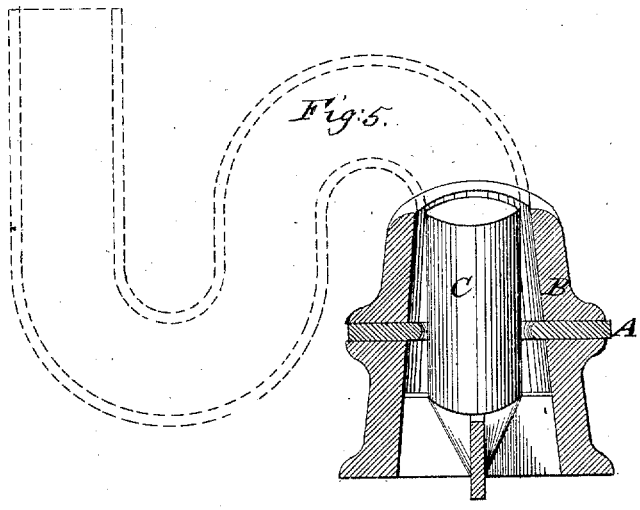
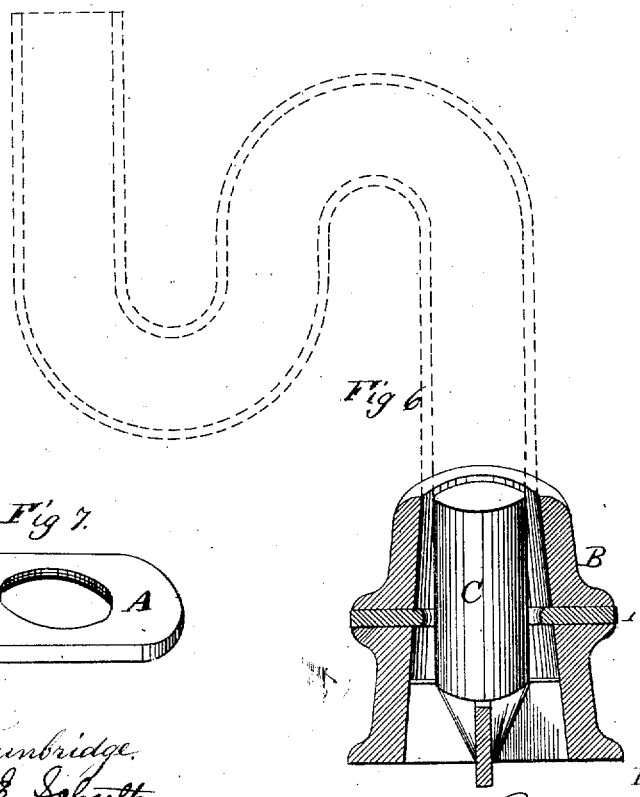
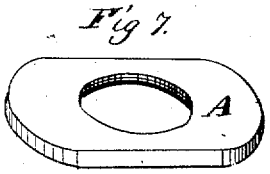
Witnesses:
John C. Tunbridge.
Wilg H. E. Schmitz.
Inventor:
Robert Cunningham
by his attorney
A. v. Briesen

UNITED STATES PATENT OFFICE.

ROBERT CUNNINGHAM, OF CHICAGO, ILLINOIS, ASSIGNOR TO ELIPHALET W. BLATCHFORD AND CALEB F. GATES, BOTH OF SAME PLACE.

DEVICE FOR MAKING PLUMBERS' TRAPS.

SPECIFICATION forming part of Reissued Letters Patent No. 9,779, dated June 28, 1881.

Original No. 139,946, dated June 17, 1873. Application for reissue filed August 3, 1880.

DIVISION B.

*To all whom it may concern:*

Be it known that I, ROBERT CUNNINGHAM, of Chicago, in the county of Cook and State of Illinois, have invented a new and Improved Method of Making Lead or Composition Water-Traps, of which the following is a specification.

Figure 1:
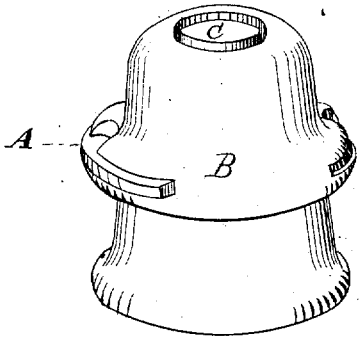

Figure 1 represents a perspective view of the device for making lead traps according to my invention. Figs. 2, 3, 4, 5, and 6 are sectional views of the same, showing the diaphragm in its several positions. Fig. 7 is a perspective view of said diaphragm.

This invention relates to a new process of making bent lead traps; and it consists in forcing a ring of lead or composition through a die and around a mandrel, at the same time regulating the quantity of lead forced out on either side of the mandrel at a distance from the discharge end of the die, thereby producing the requisite curves and straight parts of the trap. When more metal is forced out at one side of the mandrel than at the opposite side a curve is produced in the pipe; but when the metal is forced in equal quantities all around the mandrel a straight pipe is produced.

In the accompanying drawings, the letter A represents the movable diaphragm; B, the die; C, the mandrel of an apparatus for carrying my invention into effect. The mandrel is held centrally in the die by means of wings.

The die B is to be attached to a reservoir holding the lead or composition, to be forced through the die by any suitable power. Said reservoir is not shown in the drawings.

Figure 2:
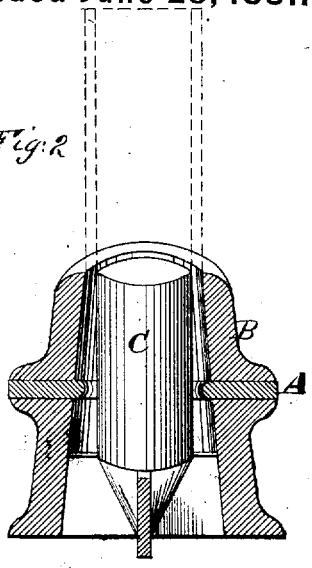
Figure 3:
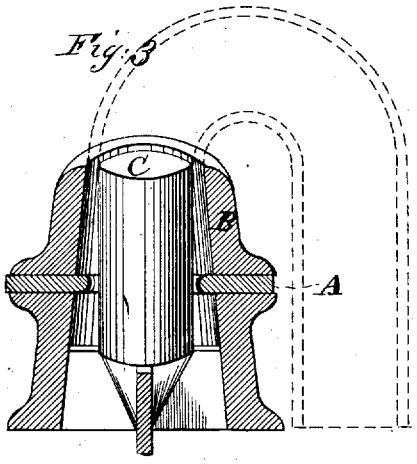
Figure 4:
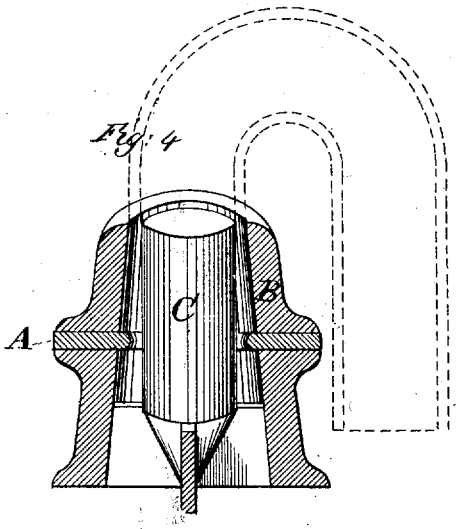

In operation, if the diaphragm A is in the center, as in Fig. 2, the lead or composition will pass out in the form of a straight pipe. By moving the diaphragm A A to one side, as in Fig. 3, it will reduce the amount of lead or composition passing out on that side and allow it to pass out on the other side, forming a curve. Then, by moving the diaphragm A A back to the center, as in Fig. 4, the composition will pass out, as before, in the form of a straight pipe. Now, move the diaphragm A A to the opposite side, as in Fig. 5, and it will reduce the amount of lead or composition passing out on that side and allow it to pass out in excess on the other side and form a curve the reverse of the first, and by again moving the diaphragm A A to the center, as in Fig. 6, it will allow the lead or composition to pass out, forming a straight pipe. Thus, as the quantity of lead is increased or diminished on either side of the mandrel alternately, it is, upon issuing from the die, caused to assume the desired curve, and is thus formed into a continuous trap of uniform size and thickness in every part.

I claim—

The method described of making curved lead pipe and plumbers' traps—to wit, forcing the lead through a fixed die around a fixed central mandrel, and regulating and at will changing, at a distance from the mouth of the die, the quantities of lead passing on different sides of the mandrel, substantially as described.

ROBERT CUNNINGHAM.

Witnesses:

J. A. TROUP,

N. H. BLATCHFORD.